(12) United States Patent
Sauermann

(10) Patent No.: US 7,415,458 B2
(45) Date of Patent: Aug. 19, 2008

(54) COMPUTER SYSTEMS AND METHODS FOR OPERATING A COMPUTER SYSTEM

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 430 days.

(21) Appl. No.: 10/927,314

(22) Filed: Aug. 27, 2004

(65) Prior Publication Data

US 2005/0114323 A1 May 26, 2005

(30) Foreign Application Priority Data

Aug. 27, 2003 (EP) .................................. 03019348

(51) Int. Cl.
*G06F 17/30* (2006.01)
(52) U.S. Cl. ....................................................... 707/3
(58) Field of Classification Search ..................... 707/1, 707/2, 9, 10, 202, 3; 711/145; 714/19; 709/224
See application file for complete search history.

(56) References Cited

U.S. PATENT DOCUMENTS

| | | | | |
|---|---|---|---|---|
| 3,611,316 | A * | 10/1971 | Woodrum | 707/7 |
| 5,381,545 | A * | 1/1995 | Baker et al. | 714/19 |
| 5,636,360 | A * | 6/1997 | Courts et al. | 711/145 |
| 6,292,808 | B1 * | 9/2001 | Obermarck et al. | 707/202 |
| 6,321,234 | B1 * | 11/2001 | Debrunner | 707/202 |
| 6,466,950 | B1 * | 10/2002 | Ono | 707/202 |
| 7,043,504 | B1 * | 5/2006 | Moore et al. | 707/202 |
| 2002/0103897 | A1 * | 8/2002 | Rezvani et al. | 709/224 |
| 2003/0182327 | A1 * | 9/2003 | Ramanujam et al. | 707/204 |
| 2004/0236984 | A1 * | 11/2004 | Yamasaki | 714/6 |

FOREIGN PATENT DOCUMENTS

| | | |
|---|---|---|
| WO | WO 02/061612 A2 | 8/2002 |
| WO | WO 02/061613 A2 | 8/2002 |

(Continued)

OTHER PUBLICATIONS

P. Ram and L. Do, "Extracting Delta for Incremental Data Warehouse Maintenance," Data Engineering, 2000, Proceedings, 16th International Conference on San Diego, USA (Feb.-Mar. 2000), pp. 220-229.

(Continued)

*Primary Examiner*—Etienne P LeRoux
(74) *Attorney, Agent, or Firm*—Finnegan, Henderson, Farabow, Garrett & Dunner, L.L.P.

(57) ABSTRACT

Methods and computer systems are provided for updating structured data. In one implementation, a system is provided that comprises a database with a set of data stored therein, at least one host computer connected to the database via a database interface, an application program adapted to be run on the host computer and interacting with the database, and a search engine connected to the application via an application program interface. The search engine may include a main memory for storing a subset of data of the set of data as an initial load. Further, the system may include a recording element to retain a record of any changes to the subset of data occurring in the database since the storing of the subset in the main memory as initial load, wherein the record of changes serve as a basis for updating the initial load.

17 Claims, 13 Drawing Sheets

FOREIGN PATENT DOCUMENTS

WO     WO 02/095632 A2     11/2002

OTHER PUBLICATIONS

Dina Bitton et al., Performance of Complex Queries in Main Memory Database Systems, Proceedings of the International Conference on Data Engineering, Los Angeles, USA (Feb. 1987) pp.72-81.

Jim G. Reuter, "Transaction Processing: Concepts and Techniques," Chapter 9: Log Manager, 1993, pp. 493-525.

* cited by examiner

COMPUTER SYSTEMS AND METHODS FOR OPERATING A COMPUTER SYSTEM

BACKGROUND OF THE INVENTION

I. Field of the Invention

The present invention generally relates to the field of electronic data processing and, more particularly, to computer systems and methods for operating a computer system for updating structured data.

II. Background Information

WO 02/061612 A2 and WO 02/061613 A2 disclose a data structure for information systems and a database system with an optimized query option, respectively. These documents describe enhanced data structures on the basis of which a database system containing structured data can be operated more efficiently. Particularly, such an improved database system contains a new main memory based search engine for structured data, hereinafter referred to as a "speed search engine." The data resides in data structures optimized for read accesses in main memory. The data is replicated from a data source, such as a relational database management system. The replication process includes the extraction of the data from the data source and loading the data into the speed search engine, including the meta data. This process may be time consuming. It is not advantageous to repeat such an initial load regularly, for example, to obtain a later version of the data.

The role of the speed search engine is that of a secondary data storage, whereas the database is still the master and also responsible for the persistence of the data. The speed search engine allows for fast access to the data during production operation and provides full index behaviour. This means that expensive select statements due to missing or incorrect indexes do not exist, unlike in the case of a database. However, the speed search engine is not responsible for the persistence of the data. This task is still left to the database, while the speed search engine holds the data persistently in flat files in order to be able to recover using these files in case of emergency (for example, after a power failure). This avoids a new initial load of the speed search engine. However, no backups are created for these files, unlike in the case of database files. If a disk crashes and data is lost within the speed search engine, then a new initial load is necessary.

WO 02/061612 A2 and WO 02/061613 A2, both published on Aug. 8, 2002, disclose a data structure for information systems and a database system with an optimized query option, respectively. These documents describe enhanced data structures on the basis of which a database system containing structured data can be operated more efficiently. Particularly, such an improved database system contains a new main memory based search engine for structured data, hereinafter referred to as a "speed search engine." The data resides in data structures optimized for read accesses in main memory. The data is replicated from a data source, such as a relational database management system. The replication process includes the extraction of the data from the data source and loading the data into the speed search engine, including the meta data. This process may be time consuming. It is not advantageous to repeat such an initial load regularly, for example, to obtain a later version of the data.

WO 02/095632 A2 refers to a synchronous change data capture system and methodology in which for each statement of a transaction, a transaction identifier that uniquely identifies each transaction is recorded along with the change data. When the transaction is committed, the transaction identifier and a system change number for the commit is recorded in a transaction table. This method is not very time efficient because of the basic necessity to assign an individual transaction identifier to each transaction.

The document "Extracting Delta for Incremental Data Warehouse Maintenance," by Ram P. et al., Data Engineering, 2000. Proceedings. 16th International Conference on San Diego, Calif., USA 29, Feb.-March 2000, Los Alamitos, Calif., USA, IEEE Comput. Society US, 29, Feb. 2000 (2000-02-29), pages 220-229, XP010378715, ISBN: 0-7695-0506-6describes and analyzes several methods for the extraction of changes to data at a source system, including time stamps, differential snapshots, triggers, and archive logs.

WO 02/095632 A2, published on Nov. 28, 2002, refers to a synchronous change data capture system and methodology in which for each statement of a transaction, a transaction identifier that uniquely identifies each transaction is recorded along with the change data. When the transaction is committed, the transaction identifier and a system change number for the commit is recorded in a transaction table. This method is not very time efficient because of the basic necessity to assign an individual transaction identifier to each transaction.

One problem is to specify a mechanism such that the application can provide changes to a speed search engine and that the speed search engine can ensure transactional consistency of its data.

SUMMARY OF THE INVENTION

One object of the invention to provide computer systems and methods for operating a computer system with improved update mechanisms of structured data stored in a main memory search engine. This object may be achieved by implementing embodiments consistent with the proposed methods and systems for operating a structured database computer system, as disclosed herein.

In accordance with one embodiment, a method is provided that comprises periodically performing an update of a set of data stored as an initial load from a database into a main memory of a search engine. The search engine may be connected to an application using data contained in the database. Changes to the set of data in the database that occur after the initial load was stored in the search engine main memory may be retained, and the periodic update may be performed on the basis of these retained changes.

According to another embodiment, a method is provided that comprises: transferring a subset of data of the set of data as an initial load from the database via the application to the search engine; storing the initial load in a main memory of the search engine; retaining a record of any changes to the subset of data that occurred since the transferring and storing of the subset of data as the initial load; and updating the initial load in the search engine main memory periodically at predetermined time intervals on the basis of the record.

According to yet another embodiment of the invention, the step of retaining may comprise forwarding a record of the changes to a function module of a service application program interface of the application. Embodiments of the invention can be realized with the application comprising a service application program interface (API), which includes a collection of function modules that meet special requirements of the application in interconnecting with the search engine.

According to another embodiment of the invention, the record of changes can be a log table. The log table may be a central element in the update communication between the application and search engine. Further, the log table may be a transparent table situated advantageously in the application database.

According to a further embodiment of the invention, the record of changes may comprise a key portion and a data portion thus allowing a fast and reliable identification of a log record entry. Before changed data is stored in the log table, it may be split up into its key portion and its data portion. These two portions or parts are stored separately in the log table.

In order to ensure data consistency, the function module may lock the log table during the step of storing the record of changes into the log table. For example, the locking may comprise a row level locking instead of locking the whole table and, thus, reduce the probability of so-called serialization effects on the log table(s).

Embodiments consistent with the present invention also encompass computer programs with program coding means which are suitable for carrying out a process consistent with that described above when the computer program is run on a computer. The computer program may be provided itself, or stored on a computer-readable medium.

Further features and embodiments of the invention will become apparent from the description and the accompanying drawings.

It will be understood that the features mentioned above and those described hereinafter can be used not only in the combination specified, but also in other combinations or on their own, without departing from the scope of the present invention.

Embodiments of the invention are schematically illustrated in the drawings by way of examples and hereinafter explained in detail with reference to the drawings. It is understood that the description is in no way limiting on the scope of the present invention and is merely an illustration of embodiments of the invention.

DETAILED DESCRIPTION

Figure 1:
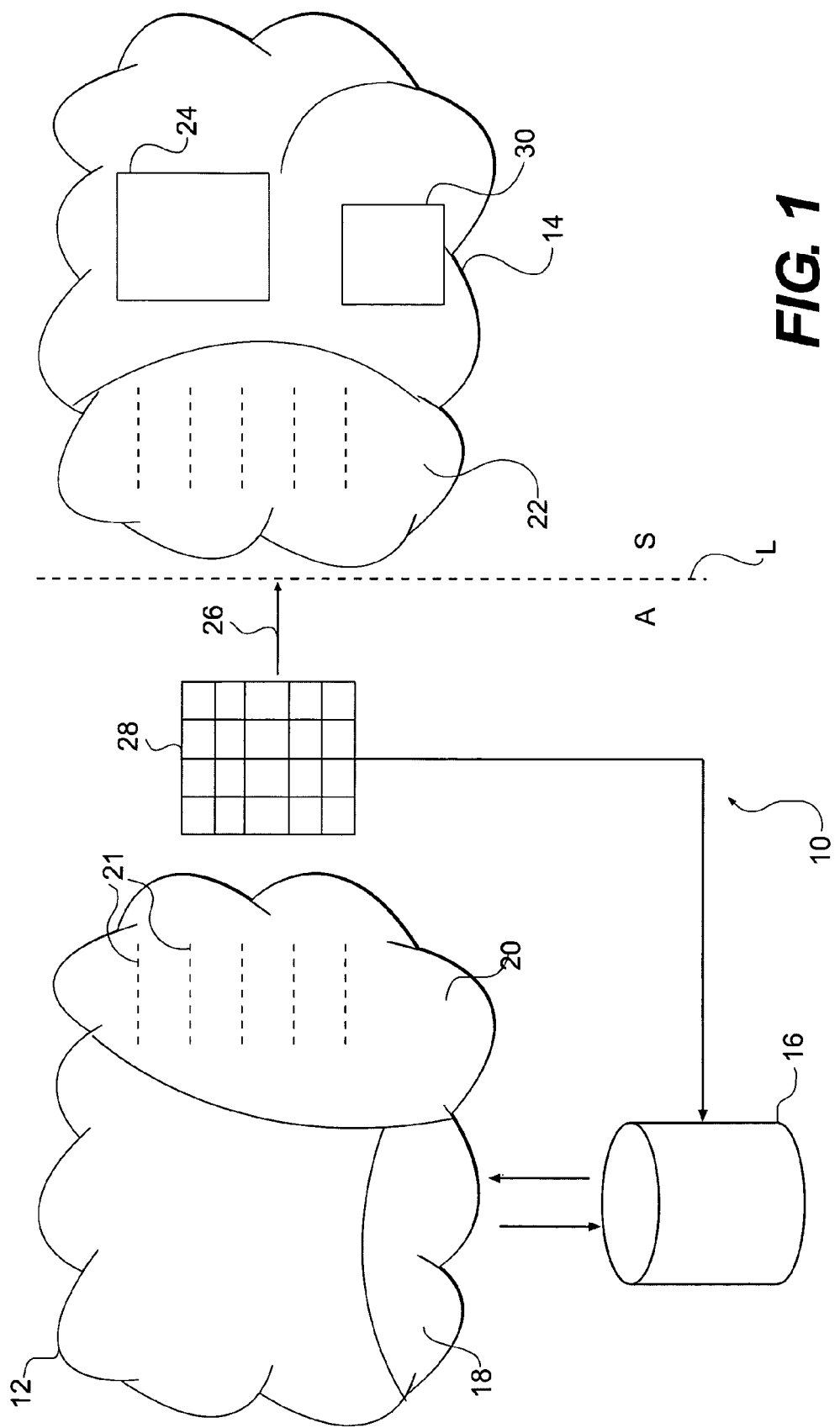
FIG. 1 is a schematic illustration of an exemplary database update mechanism and system, consistent with an embodiment of the invention.

FIG. 1 shows an exemplary database system, generally depicted with 10, consistent with an embodiment of the present invention. The database system 10 comprises an application 12 being run on a host computer (not shown), a speed search engine 14, and an application database 16 containing a set of application data.

As illustrated in FIG. 1, the database 16 may be connected with the application 12 via a database interface 18. The application 12 may further comprise a service application program interface (API) 20 to interconnect the application 12 with the search engine 14. API 20 may comprise a collection of appropriate function modules or methods, as depicted in FIG. 1 by the dashed lines 21 in the interface 20. The function modules or methods 21 may provide the API functionality. The search engine 14 in turn may comprise a corresponding API 22. The application 12 communicates with the search engine 14 via this Service API 20, that is by calling function modules 21 in the Service API 20 and receiving the response in the form of the output parameters of a function module.

The function modules 21 in the Service API 20 and their input and output parameter lists may be designed according to the needs of the application 12. As an example, for the application "Segment Builder" in mySAP CRM Marketing, a function module is needed that receives select statements in disjunctive normal form and can return a list of count results, which are displayed as a pie chart on the user interface.

The computer system 10 is divided into an application side A and a search engine side S, as indicated in FIG. 1 by the dashed vertical line L. The application side A could be, for example, an SAP application side implemented in ABAP (Advanced Business Application Programming), hereinafter referred to as an ABAP side.

In the operational use, a so-called initial load (which is a subset of data of the set of data contained in the database 16) is extracted by the application 12, e.g., by means of a background job of the application which calls so-called application extractors. These extractors can be implemented as function modules, reports or methods. The initial load is transferred to the search engine 14 and stored in a main memory 24 thereof. The precise process of the initial load will not be explained in more detail, as this is known to the person skilled in the art.

The application 12 and the speed search engine 14 can communicate via any remote communication interface which provides the functionality of calling functions in other (remote) systems. One example for such a remote communication system is the so-called remote function call (RFC) SAP interface which is depicted as arrow 26 in FIG. 1. Embodiments of the invention are further explained hereinafter by referring to a RFC interface as a remote communication system, by way of example.

Each function module call in the Service API 20 is transformed into at least one RFC call to the search engine. The RFC interface shown in FIG. 1 is the exit point for the RFC calls. The RFC interface consists of empty function modules which serve to propagate the RFC call to a certain predetermined destination. In system 10, the speed search engine may be operated as a registered RFC server.

Any changes of data that are made by the application may reach the search engine through an update mechanism, according to an embodiment of the invention. A central element of this mechanism is a log table 28, as shown in FIG. 1, located between the Service API 20 and the RFC interface 26.

The log table 28 may be a transparent table in the application database 16. An update reader process serves to read a record of changes retained in the log table 28 via the RFC interface 26. This update reader process might be run periodically, e.g., every 30 seconds or any other appropriate time interval. According to one embodiment of the invention, the time interval is predeterminable.

The update reader process is performed by an update reader 30 which is located on the search engine side S, in the embodiment shown in FIG. 1. It is to be understood that the update reader 30 also might be implemented in any other suitable manner, for example, in the API 20 on the application side A. In the latter case, the update reader could be a periodically run background job, for example, in an ABAP environment providing the search engine with update data ("push" process), whereas in the first case the search engine actively gets the update data it requires ("pull" process).

The log table 28 thus may serve to retain a record of changes that were made to the initial load data set since this data was stored in the search engine's main memory 24.

Figure 2:
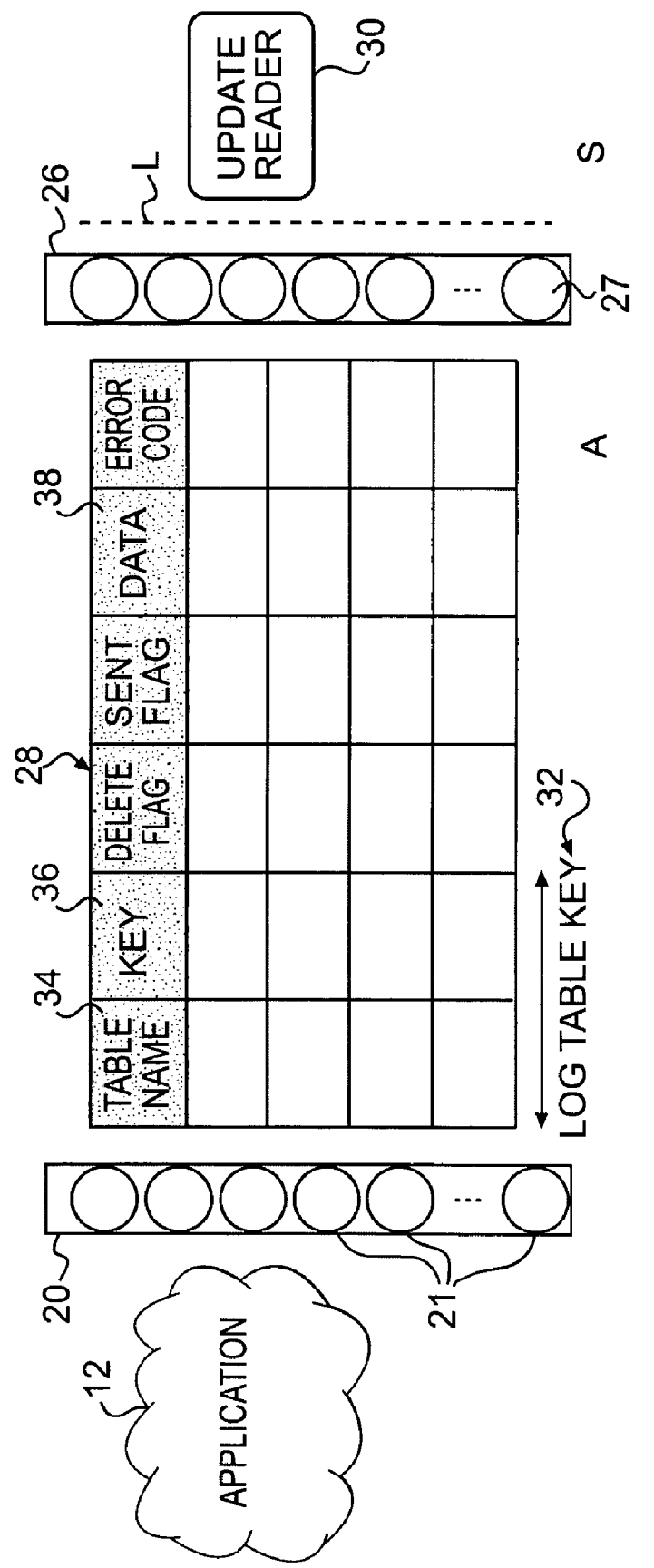
FIG. 2 shows an exemplary log table, consistent with an embodiment of the invention.

FIG. 2 shows an exemplary log table 28, consistent with an embodiment of the invention. FIG. 2 shows only the elements needed to explain the update mechanism. Particularly, FIG. 2 depicts on its left hand side the application 12 with the API 20 shown as an elongated vertical rectangle containing function modules 21. The function modules 21 are shown as circles in contrast to the illustration of FIG. 1 where the function modules 21 are shown as dashed lines. It is of course to be understood that these are merely schematic illustrations and that the person skilled in the art is aware of the functionality of the identified elements irrespective of their respective illustrative appearance.

On the right hand side of the log table 28 in FIG. 2 is the RFC interface 26, also shown as an elongated vertical rectangle containing function modules 27. Beyond the vertical dashed line L which indicates the border between the application side A and the search engine side S is the update reader 30 forming part of the search engine (not shown).

The updated records of many different search engine tables may all be stored in one log table. Note that the log table 28 shown in FIG. 2 does not simulate a queue, since a queue is not necessarily needed. In the log table 28, each record is identified by a so-called log table key 32, which is made up of the attributes Search engine table name 34 and Key 36.

To make a change, the application 12 calls a particular function module 21 or method in the Service API 20. This function module 21 receives the full record after the change. Before the record is stored in the log table 28, it is split into its key part and a data part. These parts are stored separately in the log table 28. All key fields of the record are concatenated using fixed lengths or variable lengths using a delimiter in the log table key field Key. The field Key 36 must be large enough (for example, CHAR 250) to store the largest key occurring in one of the tables stored in the speed search engine 14. All fields of the data part of a record are concatenated into a single string using fixed lengths or variable lengths using a delimiter and stored in a column titled Data 38. This column Data 38 must be wide enough to store the largest data part occurring in any of the tables stored in the speed search engine 14.

Figure 3:
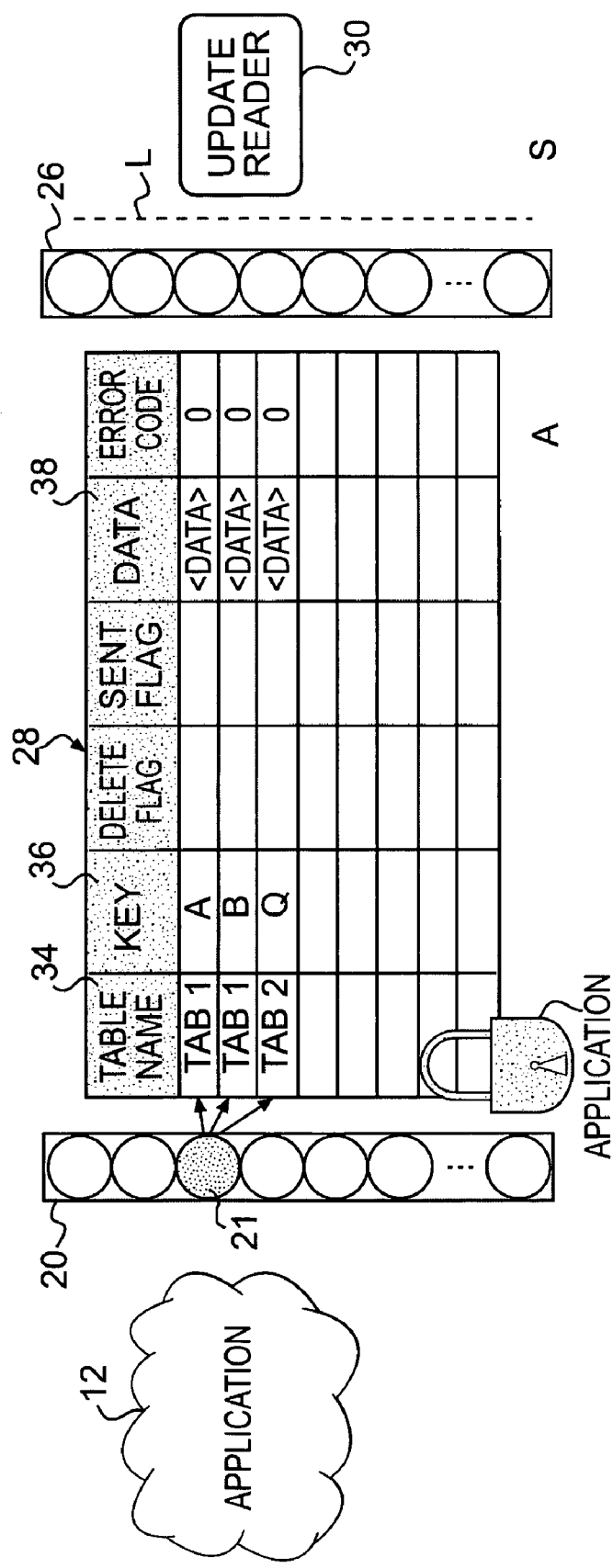
FIGS. 3 to 11 depict examples of sequential writing, reading and updating with a log table, consistent with an embodiment of the invention.

FIG. 3 illustrates an example of how the application 12 writes three updated records into the log table 28 by calling an appropriate function module 21 in the Service API 20. Writing the records into the log table 28 is a database operation. Therefore, the function module 21 of the Service API 20 must lock (or enqueue) the table for this write access. As the log table 28 is a shared resource that is used to store the updated records for all the speed search engine tables, row level locking instead of locking the whole log table can be used, thus reducing the probability of serialization effects on the log tables.

After the data is written to the log table 28, the function module 21 in the Service API 20 releases (or dequeues) the lock and returns to the application 12. The records shown in the embodiment of FIG. 3 refer to two different speed search engine tables, Tab1 and Tab2. They have the concatenated keys A, B, Q. A value of 0 in the error code column 40 (or any other appropriate default value) indicates that no errors occurred. The error code column 40 will be explained in more detail below.

Figure 4:
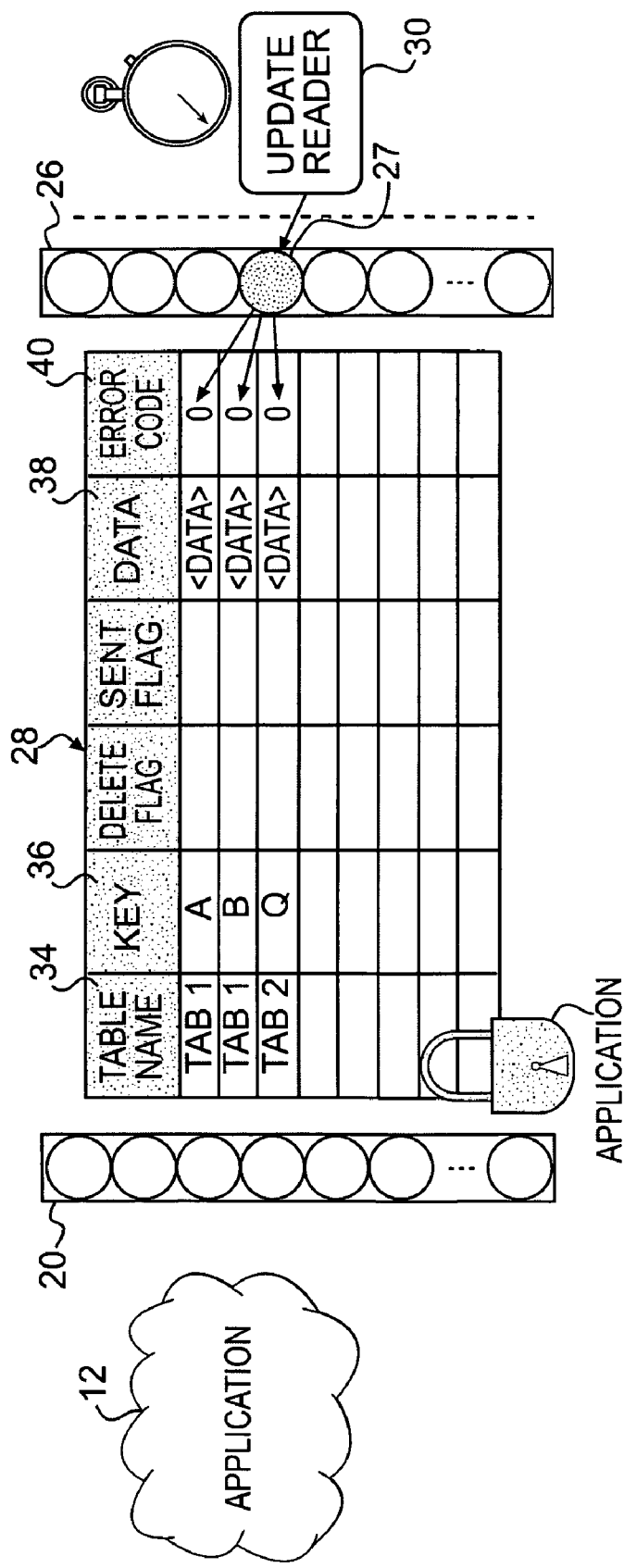

Referring to FIG. 4, the periodically scheduled update reader 30 calls a function module 27 in the search engine's RFC interface 26 on the application side A. This is one of the function modules 27 in the RFC interface 26 which is not empty, since it contains the code for the actions to be taken upon the update reader call. The function module 27 locks the log table 28 to prevent the application 12 from writing updated records to the table. Next, the function module 27 reads all records for which the SENT flag 42 is not set by using a select statement on the application database 16.

Figure 5:
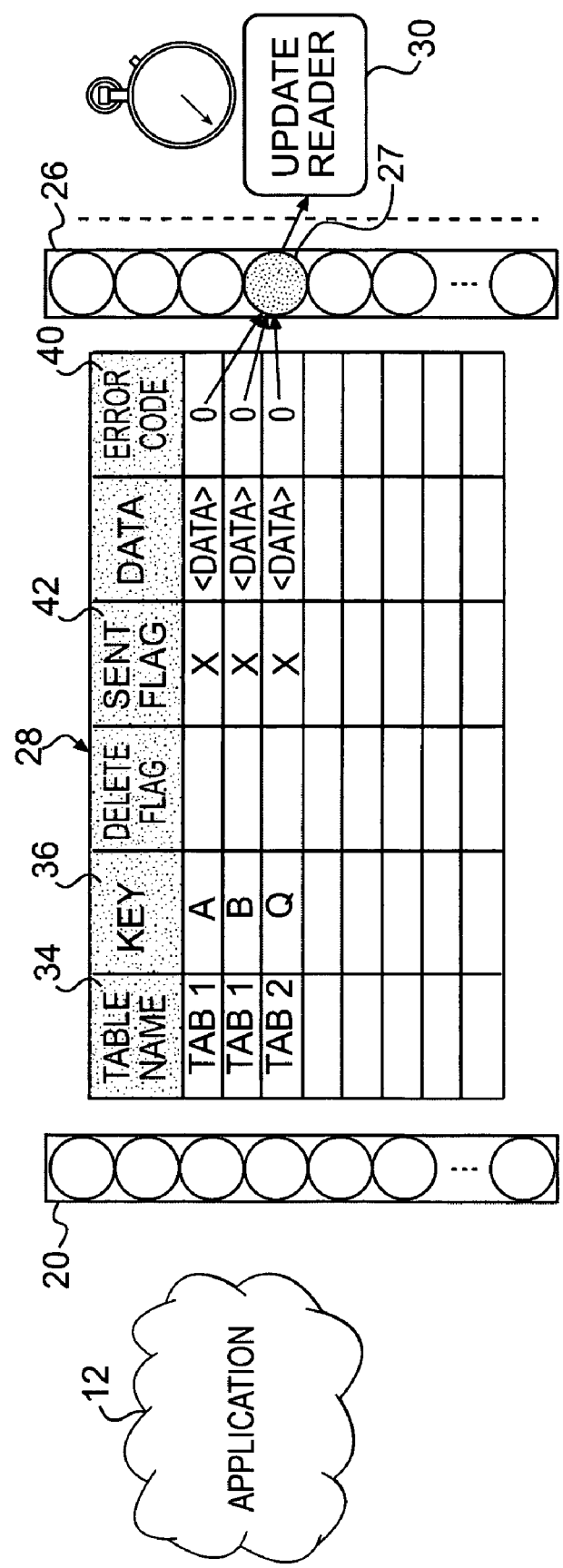

FIG. 5 shows, by way example, that the function module 27 in the RFC interface 26 that has been called by the update reader process may not only read the updated records from the log table 28, but also set the SENT flags 42 for the records that are read. The data is returned to the update reader 30, for example, in the form of an ABAP internal table as response to the call. Reading the data from the log table 28 and setting the SENT flags 42 are database accesses. After the data has been read from the database 12, but before it is sent to the speed search engine 14, the table lock may be released.

Figure 6:
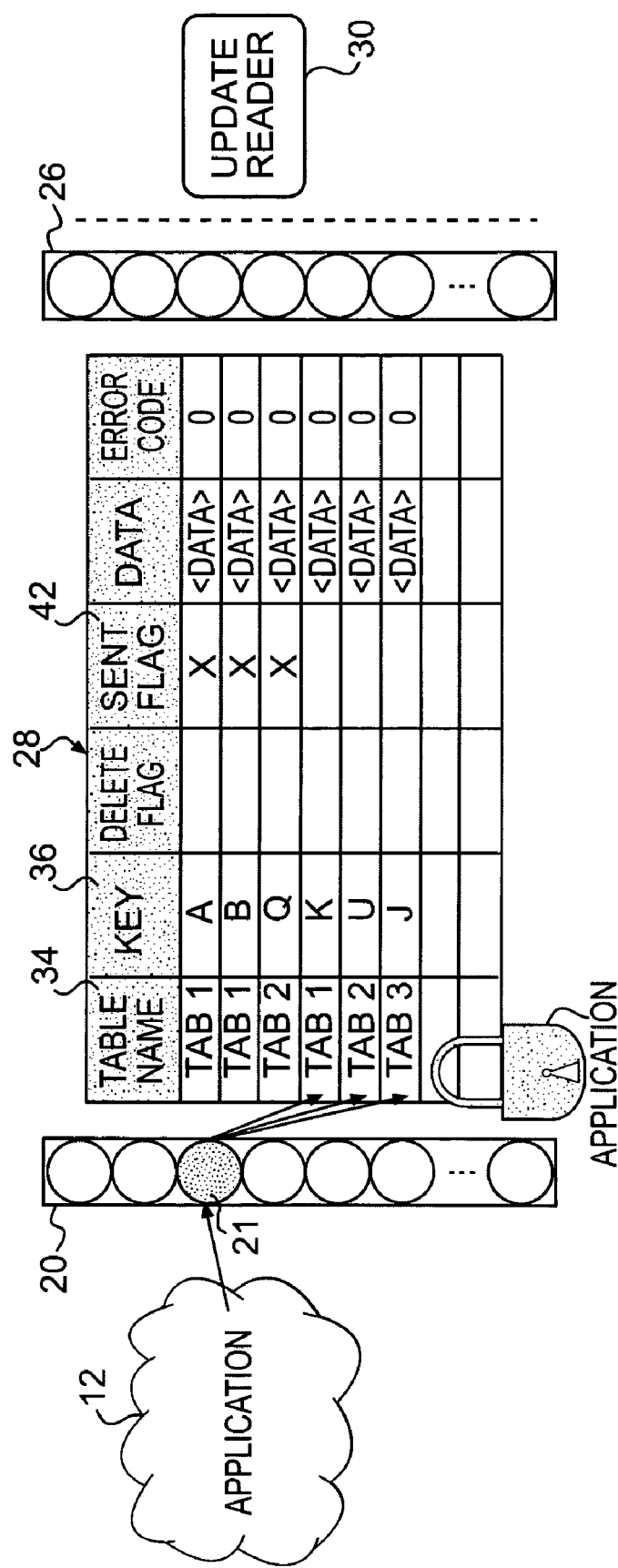

Referring to FIG. 6, the application 12 may call a Service API function module 21 to lock the log table 28 and write new records into the table. The previously sent records remain in the log table 28 since the speed search engine 14 has not yet committed them. After the write operation, the Service API function module 21 may unlock the log table 28.

Figure 7:
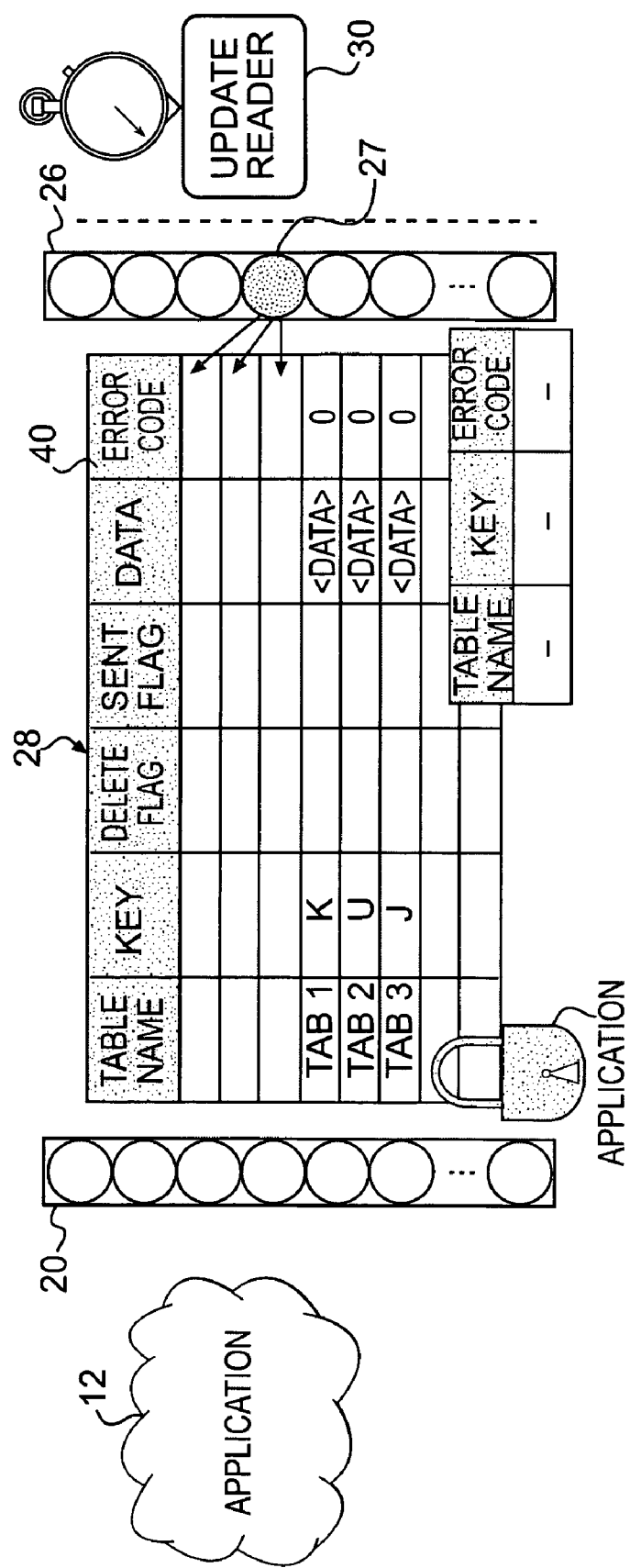

According to FIG. 7, the next time that the update reader 30 is activated, it may provide a list of error codes 40 for any previously sent records that were not stored successfully in the speed search engine 14. More precisely, the internal search engine update mechanism first makes a persistent file copy of the updated records read from the log table 28. If this operation fails, the whole bundle of records to be stored fails, otherwise all records succeed. The search engine internal update mechanism is "all or nothing" in the sense that, if some records in a set of records fail, none of the others in the set can be stored successfully. In the case shown in FIG. 7, no errors are reported and the error list provided by the function module 27 is empty. This means that all records sent in the last update reader call have been stored successfully in the speed search engine 14.

Consistent with one embodiment, the function module 27 in the RFC interface 26 called by the update reader 30 locks the log table 28 against changes by the application 12. The function module 27 deletes all records with SENT flags from the log table 28, since no error has been reported. Providing the error list and deleting the records with SENT flags is a search engine commit.

Figure 8:
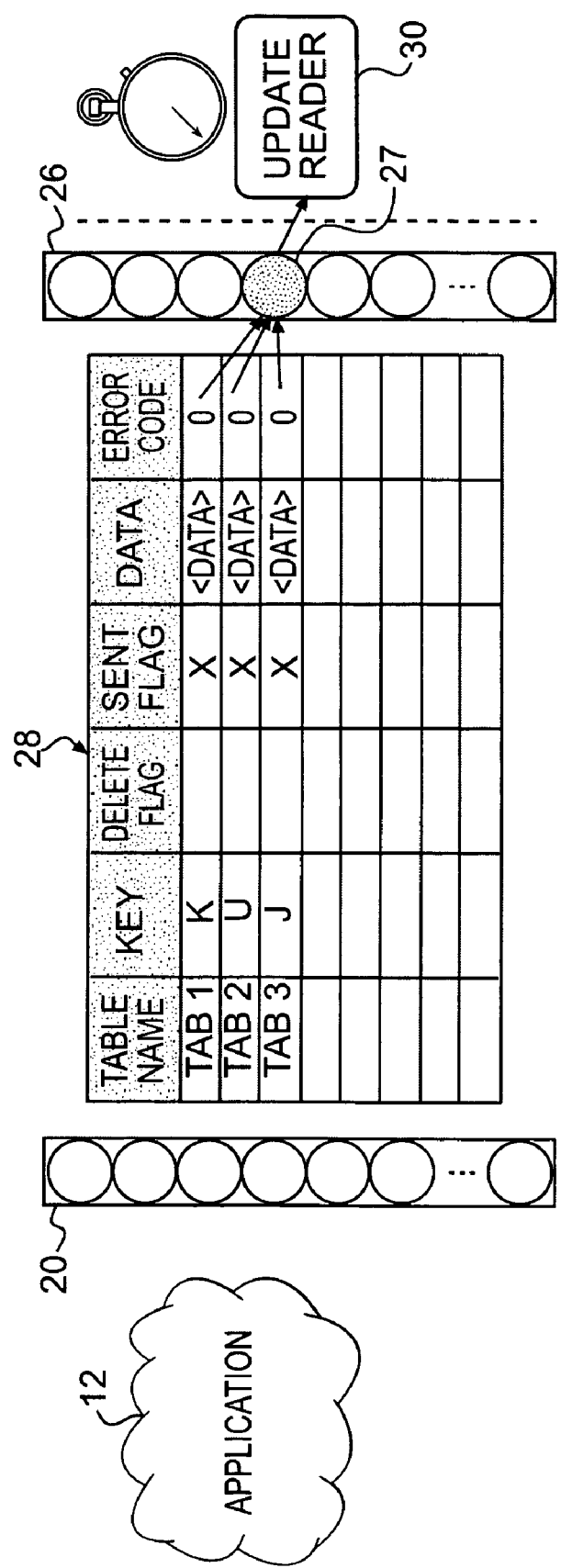

In FIG. 8, the latest records which do not yet have SENT flags are forwarded to the update reader 30 and SENT flags are set for them in the log table 28. The lock on the log table 28 is then released.

Figure 9:
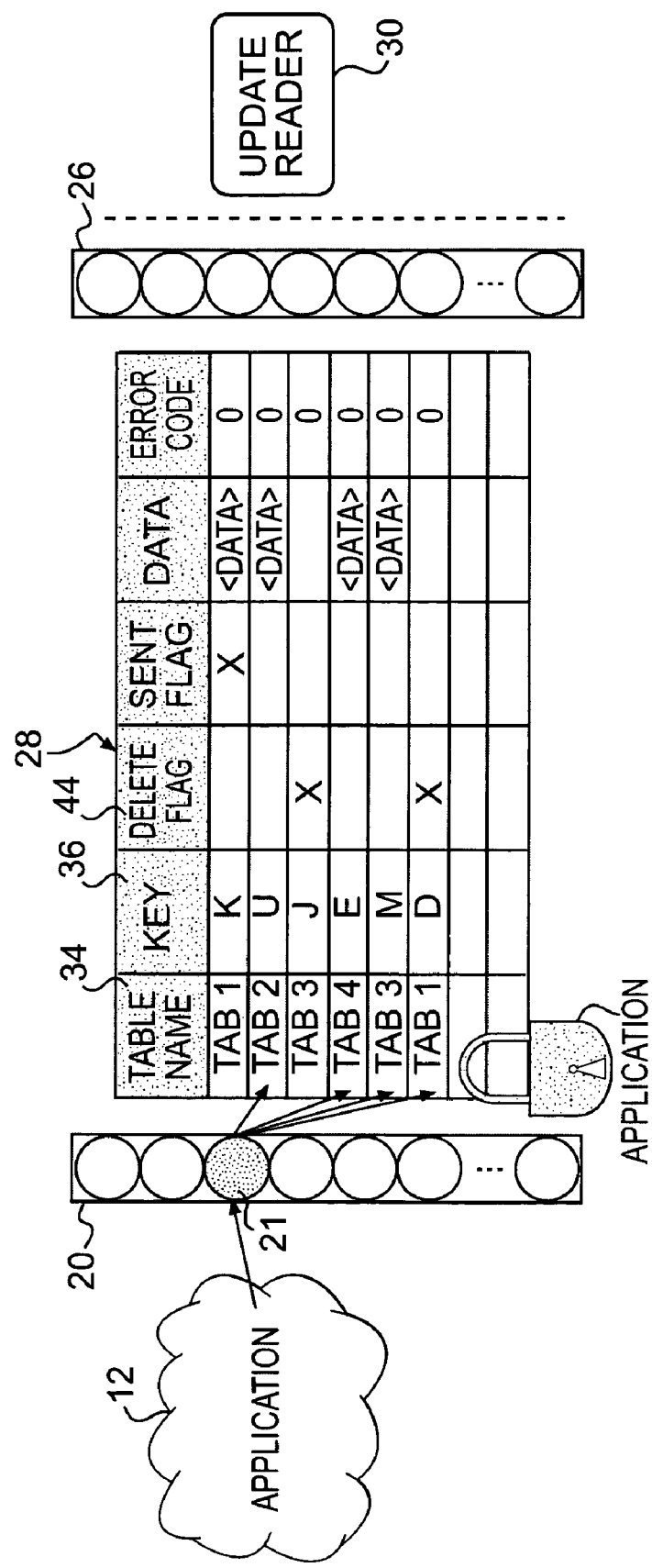

Referring to FIG. 9, the application now proceeds with the following steps:

Updating record Tab2_U by overwriting the existing record with new data (not by writing a new record);

Writing the new delta data Tab4_E, Tab3_M, Tab1_D into the log table 28; and Deleting the records Tab3_J and Tab1_D from the speed search engine 14 by setting the DELETE flag in column Delete Flag 44 for these two records and deleting the SENT flag, if it was set.

No data is needed for any records to be deleted in the speed search engine 14. If any record in the log table has no SENT flag or loses its SENT flag, it is resent. In the case depicted in FIG. 9, Tab2_U (since updated) and Tab3_J (since deleted) lose their SENT flag.

Figure 10:
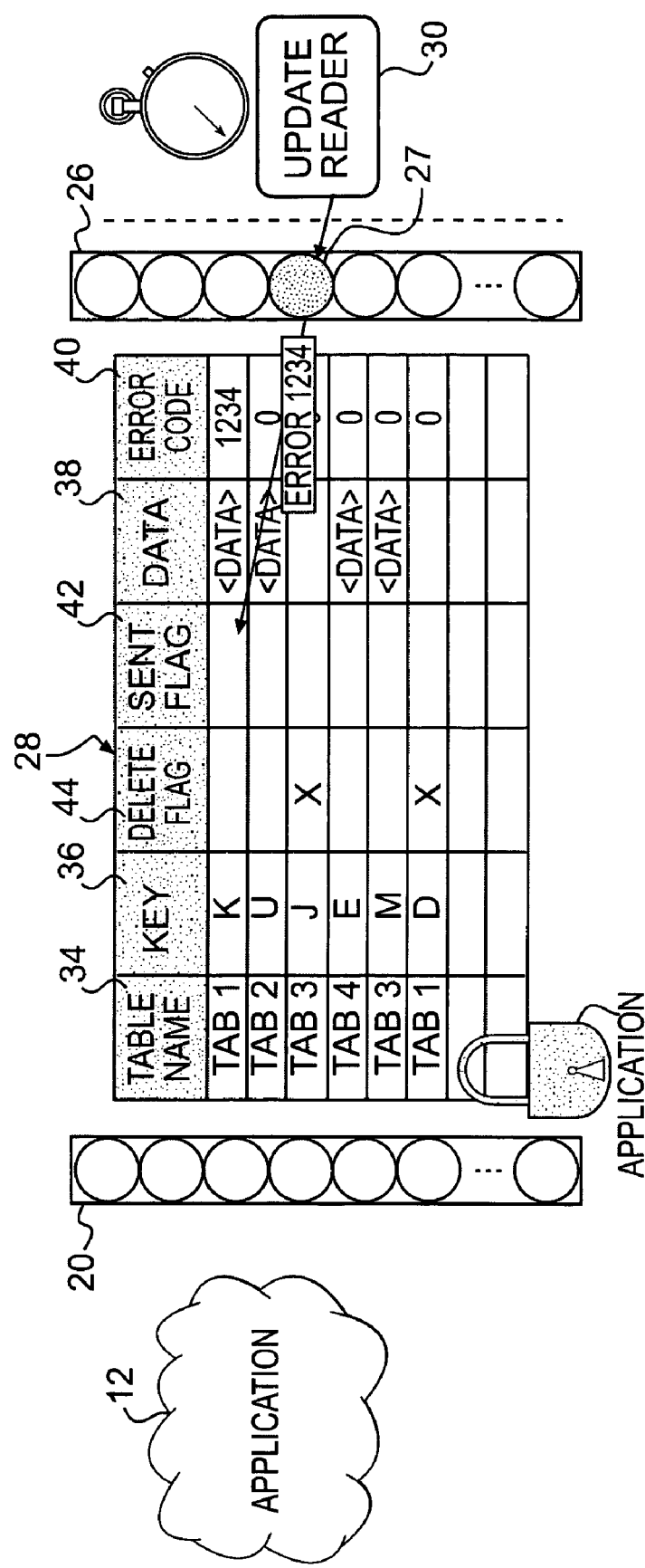

Referring to FIG. 10, the next scheduled call of the update reader 30 occurs. The reader 30 may report an error for the previously sent records (cf. FIG. 8). Since internal update mechanism behaviour of the search engine 14 is such that either all or no records of a set of records are stored, the reader 30 does not need to provide a list of records that have an error. It is thus obvious that in the situation described herein and illustrated in FIG. 10, the speed search engine 14 has stored none of the records sent previously. Therefore, it is sufficient for the update reader to return one single error code for the whole set of records.

As shown in FIG. 10, error code 1234 is reported for the previously sent records Tab1_K, Tab2_U, Tab3_J. However, in the time since those records were sent, the application 12 has modified the records Tab2_U and Tab3_J in the log table 28. Tab2_U has been overwritten by an update and Tab3_J is to be deleted in the speed search engine 14. The only record that is still in the same state as when it was sent is record Tab1_K. Therefore, the error code 1234 is written into field Error Code only for this record.

Depending on the reason for the error (the error code), the following actions may be taken:
- The application 12 is informed about the error and is expected to take action.
- The Service API 20 deletes the SENT flag in order to resend the record to the speed search engine 14 (e.g. a defined number of times) without informing the application 12.
- The faulty record stays in the log table 28 and an administrator takes manual action (such as deleting it or resending it manually) using a monitoring tool.

The speed search engine 14 assumes that a record with error code>0 has to be resent. This is achieved simply by deleting the SENT flag. In FIG. 10, no record in the log table 28 has a SENT flag so that no records have to be removed from the table (cf. search engine commit as explained above).

Figure 11:
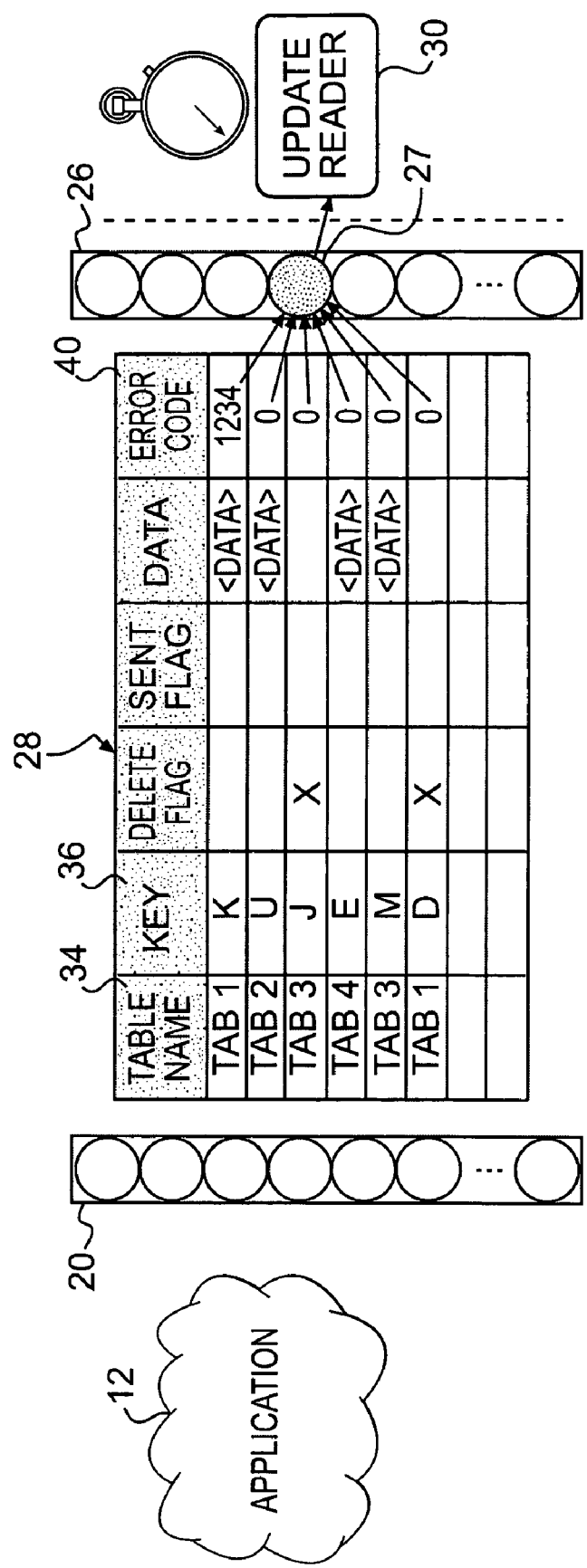

Referring to FIG. 11, all the records that are currently stored in the log table 28 may be sent to the speed search engine 14. However, there are different reasons why a record may be sent. For example, some records are new and are now sent for the first time. One record, Tab1_K, has an error code>0 and has to be resent. This record's SENT flag has been removed, so it behaves like a newly added record and is sent to the speed search engine 14. Instead of being deleted from the log table 28, the already committed records Tab2_U and Tab3_J are resent to the speed search engine 14 because the SENT flag is no longer set (the application has changed the records). Records with DELETE flag set are to be deleted in the speed search engine 14 (no data is needed). If the changes are committed successfully and the application 12 makes no further changes to them, all these records are deleted from the log table 28 during the next update reader call.

A communication failure due to a connection breakdown can occur at the following points in time: during network transmission; after the call has been sent by the update reader 30 but before it arrives for example at RFC interface 26 on the application side A; after the call has been sent by RFC interface 26 but before it returns to update reader 30; or during the processing of the update reader call on the application side A, for example, when accessing the database 16. In any of these cases, the update reader 30 may get a system failure error as return code of the call.

The error situation may be handled as follows. The first time the update reader 30 is called after a connection breakdown, the update reader 30 sets a flag "resume_after_connection_breakdown". If this flag is set, then on the application side A all the records that have accumulated in the log table 28 are sent, independent of the status of their SENT flags. Some of the records in the log table 28 may have been updated (even several times) and have lost their SENT flag. Other records may not have been updated but may already have been sent to the speed search engine 14. If these records are sent a second time, no inconsistency is caused: the same data is just stored twice. The longer the connection is down, the more likely it is that a large number of records have lost their SENT flag due to subsequent updates.

After a connection breakdown, the number of updated records in the log table 28 may be too large to send in one call. Advantageously, the data in the log table 28 may be packaged if this occurs. A flow diagram for a possible packaging algorithm is shown by way of example in FIG. 12. All records with an unchecked SENT flag must be sent upon an update reader call (step S1 in the flow diagram of FIG. 12). The number of records to be sent can be calculated on the database using a select count(*) statement (steps S2 to S4). If the number of records to be sent is larger than the allowed maximum number (limit) of records per call (e.g. 1,000), then a flag "last_package" is set to blank (steps S5 and S7). The update reader returns to the speed search engine with a number of records (e.g. 1,000) and the flag "last_package" blank (step S8). Because the flag is blank, the update reader 30 recalls immediately to get the next package of records (steps S9 and S1). During the next call, if the update reader 30 reports no error in the error list, the previously sent records are deleted from the log table. This is repeated until the application function module has sent the last package and set flag "last_package" to X (step S6). Normally, only one call is required per update reader cycle. Then the flag "last_package" is immediately set to X. In the embodiment of the invention as described herein, steps S1, S9 and S10 are performed on the search engine side S by the update reader 30, and steps S2 to S8 are performed on the application side A by the RFC interface 26.

Figure 12:
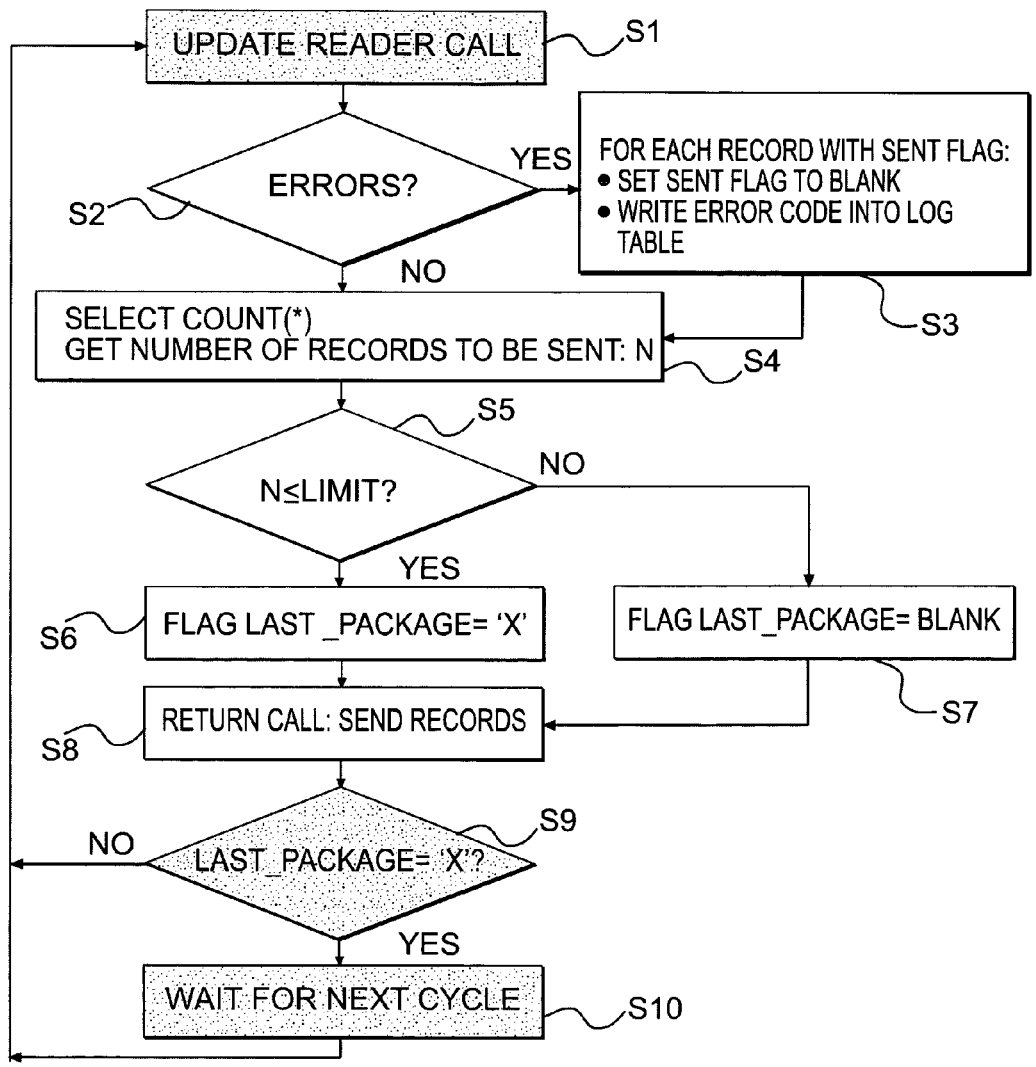
FIG. 12 is a flow diagram of an exemplary packaging algorithm used in connection with a log table data transmittal.

Still referring to FIG. 12, it is assumed that the update reader 30 is located on the search engine side S. However, as already explained above and discussed in more detail hereinafter, the update reader 30 may also reside for example on the application or ABAP side A. In that case, too, the packaging solution can be applied.

Figure 13:
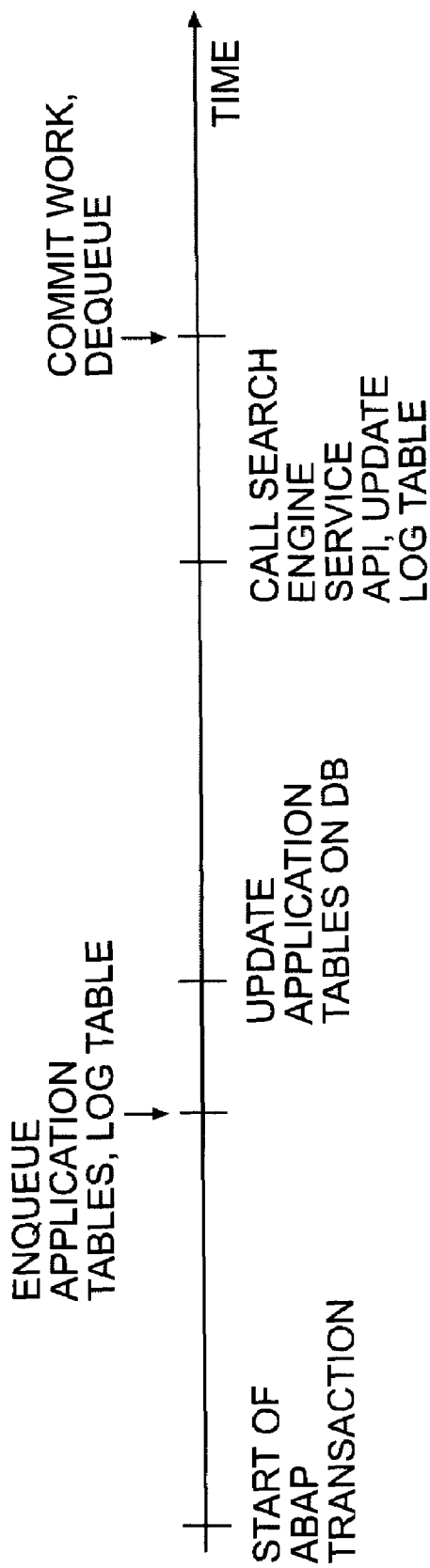
FIG. 13 shows, by way of example, a time axis with a sequence of operational steps for ensuring transactional data consistency, consistent with an embodiment of the invention.

FIG. 13 shows an example of how transactional consistency is ensured if the application performs synchronous updates on the database. The principle is to use the SAP enqueue/dequeue mechanism, since this mechanism ensures that only one transaction at a time changes data on an application table and the log table. To achieve this, the application 12 has to use the enqueue/dequeue mechanism correctly. Also, the application 12 must call the Service API 20 between the enqueue and the COMMIT WORK, as illustrated in FIG. 13. The COMMIT WORK of an application ensures "all or nothing" behaviour. If the COMMIT WORK fails, either all the changes on the application tables and the corresponding update records in the log table 28 are written to the database 16 or none of the changes are written to the database 16 (such as when an update aborts). For this reason, the speed search engine 14 does not need a rollback mechanism.

Records in tables provide a technical view of the data that emphasizes the structures in which it is stored. An application treats data rather in units of business objects such as customer order, invoice, purchase order, business partner, product, and so on. In a database, each business object is stored in the form of many records in many different tables due to complex data models. If a business object is updated, many records are changed. If the changes to a business object are sent to the speed search engine by calling an appropriate function module of the Service API, then many records referring to one or more search engine tables are written to the log table in one so-called logical unit of work (LUW). The changes to the business object are only consistent if either all or none of the relevant records are written to the log table. If only a part of the relevant records is written to the log table, this leads to an inconsistent state of the business object within the speed search engine, for example that only two third of a product are updated. A logical unit of work or LUW can thus be seen as a logical bracket around a given number of database and computer system transactions needed for an update and which are stored/written in their entirety in order to avoid data inconsistencies.

As already explained above, the problem may be solved by using the SAP enqueue mechanism which ensures the required "all or nothing" behaviour. Therefore, the log table 28 may always contain a consistent image of the changes of a business object in the form of several updated records that represent one LUW. This unit of records is indivisible, to ensure that the image of the changes to the business object remains consistent.

However, there is no field in the log table 28 that stores information about the association of a record to a LUW, such as a counter value or a timestamp. The update reader 30 has no information about LUWs. It reads data in units of records and not in units of LUWs.

This does not destroy the consistency of the data. Despite the missing LUW information in the log table 28, the update reader 30 can provide consistent data to the speed search engine, for the following reasons:

Complete LUWs in log table: Either all records of a LUW are stored in the log table or none. This ensures that LUWs are complete (cf. discussion above).

Read consistency ensured: The SAP enqueue mechanism ensures that either the application writes data to the log table 28 or the update reader 30 reads the data, but not both at the same time. This ensures read consistency for the update reader 30.

Reading data in one step: Although the update reader 30 cannot distinguish between the different LUWs, each time the update reader 30 is scheduled, all records with SENT flag blank are read. So if complete LUWs are written to the log table 28, then complete LUWs are provided to the speed search engine 14. The grouping of the records and their LUWs is not destroyed.

If the data is read in portions, the update reader 30 does not stop until all portions have been read. So in this case, too, complete LUWs are provided to the speed search engine 14. Since the data is read under the protection of different enqueues, it is possible that between two enqueues an application could change the data in the log table 28. However, the newly inserted or updated records in the log table 28 have SENT flag set to blank to indicate that during the current scheduling cycle of the update reader 30 they will be provided to the speed search engine 14 in one of the following packages.

Consistency is ensured only for all packages together. If one package has errors and is rejected, then the other packages successfully stored in the speed search engine 14 may contain incomplete and therefore inconsistent LUWs. However, the speed search engine 14 may not integrate the packages of updated records into its internal data structures until all packages have been received successfully. If errors occur, one or more packages are returned. These records then lose their SENT flag in the log table, so they are sent again during the next update reader cycle. Once all packages are stored successfully in the speed search engine 14, the speed search engine 14 has a consistent and complete set of LUWs.

Either all records read from the log table 28 are stored successfully in the speed search engine 14 or they are all rejected. Thus, the "all or nothing" behaviour continues at the level of the update reader 30. In the case of one package per update reader cycle, either all LUWs are stored successfully in the speed search engine 14 or none of the LUWs is stored, but never parts of LUWs. If packaging is used, the speed search engine 14 ensures that all packages of an update reader cycle are stored successfully before integrating them into the main memory data structures. Only then does the speed search engine 14 make the updates visible for the application 12.

As already outlined above, the update reader process can be put either on the search engine side S or on the application side A. In the latter case, the update reader 30 is a periodic background job pushing the data to the speed search engine 14 by calling an appropriate function module in the RFC interface 26. The following list of advantages and disadvantages may be of help in deciding where to locate the update reader 30:

Update reader on the speed search engine side S: Advantages: the speed search engine controls and times the update reader process; easy communication of the speed search engine with update reader process. Disadvantages: the speed search engine gets updates actively from the application side, so it is dependent on mechanisms like the log table that must work exactly as described; the update reader may need to work differently in other environments, such as Java applications.

Update reader on application side A: Advantages: the speed search engine is not responsible for getting updates, updates are just provided to the speed search engine via a defined interface, and the speed search engine need not consider their origin. Disadvantages: the speed search engine has no control over the update reader process and its periodicity; communication between the update reader and the speed search engine is via API/network: the update reader periodically tries to reach the speed search engine even if there is no connection.

Some advantages of the search engine update mechanism according to embodiments of the invention using a log table include: The application does not have to wait for the speed search engine while it reads an update or handles an error, since the Service API call returns to the application as soon as the updated records have been written into the log table. Unlike a conventional log file, the log table cannot grow indefinitely, since each updated record occurs only in one version, i.e. the latest one. The mechanism ensures transactional consistency. The solution is easy to implement. A simple display transaction can be used to monitor the log table.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of operating a computer system, the computer system comprising a database with a set of data stored therein, at least one host computer connected to the database via a database interface, an application program adapted to be run on the host computer and interacting with the database, and a search engine connected to the application via an application program interface and comprising a plurality of search engine tables and an internal update-mechanism, the method comprising:

- transferring a subset of data of the set of data as an initial load from the database via the application and function modules of the application program interface to the search engine;
- storing the initial load in a main memory of the search engine;
- retaining a set of records of a consistent image of any changes to the subset of data corresponding to at least one logical unit of work, the changes occurring in the database since the steps of transferring and storing the subset of data as the initial load;
- writing the set of records into a log table, wherein the log table is a shared resource usable to store records for the plurality of search engine tables;
- reading the set of records using an update reader;
- copying the set of records to create a persistent file copy of the set of records;
- updating the initial load on the basis of the set of records using the update reader;
- storing the updated initial load as updated data in the search engine main memory;
- determining if the set of records is stored in the search engine main memory; and
- deleting the set of records from the log table if it is determined that the set of records is stored in the search engine memory and deleting the set of records from the search engine memory if only a portion of the set of records is stored in the search engine memory.

2. A method according to claim 1, wherein updating of the initial load is performed periodically at predetermined time intervals.

3. A method according to claim 1, wherein retaining comprises forwarding the set of records to a function module of a service application program interface of the application.

4. A method according to claim 1, wherein the set of records comprise a key portion and a data portion.

5. A method according to claim 1, further comprising locking the log table during the step of storing the set of records into the log table.

6. A method according to claim 5, wherein locking comprises a row level locking.

7. A method according to claim 1, wherein updating comprises locking the log table and reading the set of records into the search engine main memory.

8. A method according to claim 7, wherein only marked parts of the log table are read.

9. A method according to claim 7, wherein only unmarked parts of the log table are read.

10. A method according to claim 1, wherein the method further comprises:

- locking the log table during storing of the set of records into the log table; and
- locking the log table during updating and reading of the set of records into the search engine main memory.

11. A computer system, comprising:

- a database with a set of data stored therein;
- at least one host computer connected to the database via a database interface, an application program being adapted to be run on the host computer and interacting with the database;
- a search engine connected to the application via an application program interface and comprising a plurality of search engine tables, wherein a subset of data of the set of data as an initial load is stored within a main memory of the search engine using an internal update-mechanism of the search engine;
- a recording element to retain a set of records of a consistent image of any changes to the subset of data corresponding to at least one logical unit of work, the changes occurring in the database since storing of the subset in the main memory as the initial load, the record of changes serving as basis for an update of the initial load which is then stored as updated data; and
- an update reader for copying the set of records to create a persistent file copy of the set of records, storing the undated initial load as updated data in the search engine main memory, determining if the set of records is stored in the search engine main memory, and deleting the set of records from the log table if it is determined that the set of records is stored in the search engine memory and deleting the set of records from the search engine memory if only a portion of the set of records is stored in the search engine memory.

12. A computer system according to claim 11, wherein updating of the initial load is performed periodically at predetermined time intervals.

13. A computer system according to claim 11, wherein the application comprises a service application program interface containing at least one function module serving to receive the set of records.

14. A computer system according to claim 13, wherein the function module serves to write the set of records into the recording element.

15. A computer system according to claim 11, wherein the recording element to retain the set of records is a log table.

16. A computer system according to claim 11, wherein the set of records comprise a key portion and a data portion.

17. A computer program product comprising a computer-readable medium and a computer program stored on the computer-readable medium with instructions suitable for carrying out a method according to any one of claims 1 to 3 and 5 to 11 when the computer program is run on a computer.

* * * * *